United States Patent
McInerney et al.

(10) Patent No.: US 8,911,914 B2
(45) Date of Patent: Dec. 16, 2014

(54) MANIFOLD ASSEMBLY FOR CONTROLLING GAS FLOW AND FLOW DISTRIBUTION IN A FUEL CELL STACK

(75) Inventors: Joseph P. McInerney, Lowell, MA (US); Louis F. Ernst, Jr., Yorktown Heights, NY (US); Mohammad Farooque, Danbury, CT (US); Ramakrishnan Venkataraman, Danbury, CT (US); Eric Hansell, New Milford, CT (US); Daniela Nedu, New Fairfield, CT (US); Keith Davis, Southbury, CT (US); William Snyder, Ossining, NY (US); Michael Quatannens, Ridgefield, CT (US)

(73) Assignee: FuelCell Energy, Inc., Danbury, CT (US)

( * ) Notice: Subject to any disclaimer, the term of this patent is extended or adjusted under 35 U.S.C. 154(b) by 437 days.

(21) Appl. No.: 13/016,519

(22) Filed: Jan. 28, 2011

(65) Prior Publication Data

US 2012/0196202 A1 Aug. 2, 2012

(51) Int. Cl.
  *H01M 8/04* (2006.01)
  *H01M 8/24* (2006.01)
(52) U.S. Cl.
  CPC ........ *H01M 8/2485* (2013.01); *H01M 8/04082* (2013.01); *H01M 8/2415* (2013.01); *Y02E 60/50* (2013.01)
  USPC ........................................................ 429/459
(58) Field of Classification Search
  USPC ........................................................ 429/459
  See application file for complete search history.

(56) References Cited

U.S. PATENT DOCUMENTS

| | | |
|---|---|---|
| 5,106,501 A | 4/1992 | Yang et al. |
| 6,887,611 B2 | 5/2005 | Cramer et al. |

(Continued)

FOREIGN PATENT DOCUMENTS

| | | |
|---|---|---|
| JP | 6-038344 A | 5/1994 |
| JP | 08-004012 A | 1/1996 |

(Continued)

OTHER PUBLICATIONS

The above references were cited the International Search Report of International Application No. PCT/US2012/022322 issued on Aug. 27, 2012.

*Primary Examiner* — Ula C. Ruddock
*Assistant Examiner* — Frank Chernow
(74) *Attorney, Agent, or Firm* — Cowan, Liebowitz & Latman, P.C.

(57) ABSTRACT

A manifold assembly for use with a fuel cell stack for the purpose of ensuring a desired flow distribution to fuel cells within the stack, with the most commonly desired being uniform flow distribution. Said manifold assembly comprising: an external manifold for abutting and sealingly enclosing a face of the fuel cell stack, wherein the manifold comprises an enclosure for one of: providing inlet gas to the fuel cell stack and receiving exhaust gas from said fuel cell stack; and one or more baffles disposed in the enclosure of the external manifold, the one or more baffles one of: (a) controlling gas flow distribution and direction of the inlet gas from the enclosure to fuel cells of the fuel cell stack to achieve a predetermined distribution or a uniform distribution; and (b) controlling gas flow distribution of the exhaust gas flow within the enclosure to achieve the predetermined distribution or the uniform distribution of gas to fuel cells of the fuel cell stack. A multi-stack fuel cell system including a baffling assembly with one or more baffles for providing a predetermined gas flow distribution to each fuel cell stack in the fuel cell system is also described. The baffling assembly is provided at a system level and comprises one or more baffles in an intake assembly and/or in an exhaust assembly of the multi-stack fuel cell system, so that each fuel cell stack receives a predetermined amount of gas.

7 Claims, 9 Drawing Sheets

(56) References Cited

U.S. PATENT DOCUMENTS

| | | |
|---|---|---|
| 7,375,791 B2 | 5/2008 | Vogel et al. |
| 7,396,601 B2 | 7/2008 | Chapman et al. |
| 7,479,336 B2 | 1/2009 | Willimowski et al. |
| 2002/0076601 A1 | 6/2002 | Guthrie et al. |
| 2007/0231659 A1* | 10/2007 | Ma et al. .......................... 429/35 |
| 2011/0086293 A1* | 4/2011 | Kong et al. ................... 429/513 |

FOREIGN PATENT DOCUMENTS

| | | |
|---|---|---|
| JP | 08-306381 A | 11/1996 |
| KR | 10-0645190 | 11/2006 |
| WO | 2009/149314 A2 | 12/2009 |

* cited by examiner

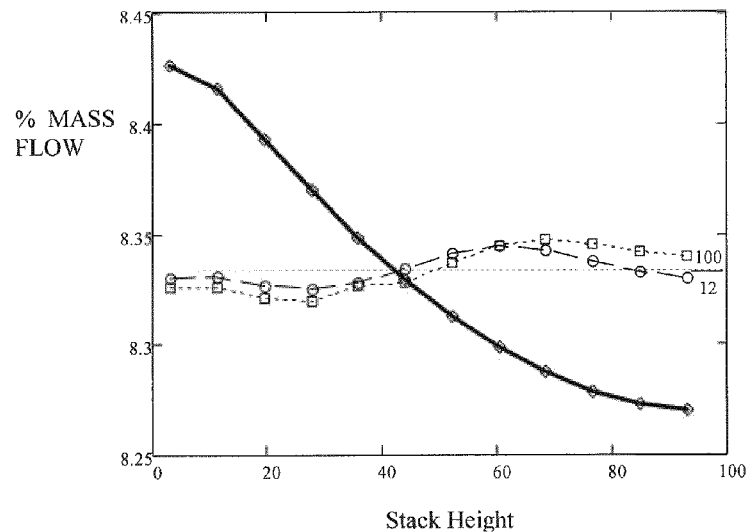
FIG. 5
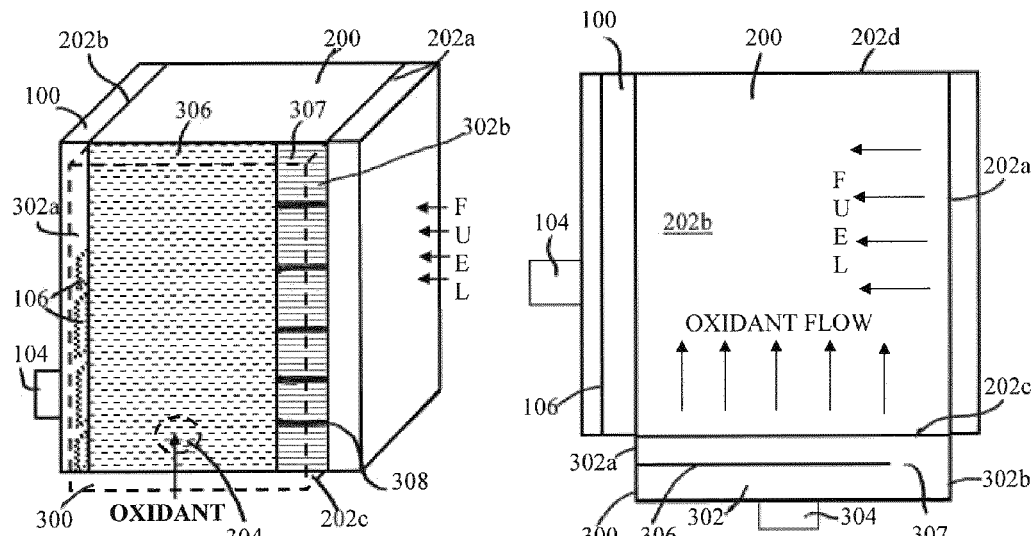
FIG. 6A  FIG. 6B

MANIFOLD ASSEMBLY FOR CONTROLLING GAS FLOW AND FLOW DISTRIBUTION IN A FUEL CELL STACK

FIELD OF THE INVENTION

This invention relates to fuel cell systems with at least one fuel cell stack and an external manifold and, in particular, to a manifold assembly or a flow distribution control assembly for use in a fuel cell system having at least one externally manifolded fuel cell stack. More particularly, the invention comprises an assembly that includes one or more baffle plates disposed in one or more of the manifolds of the fuel cell stack for controlling the flow distribution of the gases among multiple fuel cells of the stack. Variations of the baffling principal can be applied at a system level to regulate gas flow to a fuel system that includes two or more fuel cell stacks. More particularly, the system level baffling assembly comprises one or more baffle plates in an intake assembly and/or in an exhaust assembly of the multiple fuel cell system so that each fuel cell stack in the system receives a predetermined amount of gas flow.

BACKGROUND OF THE INVENTION

A fuel cell is a device that directly converts chemical energy in the form of a fuel into electrical energy by way of an electrochemical reaction. In general, like a battery, a fuel cell includes a negative electrode or anode and a positive electrode or cathode separated by an electrolyte that serves to conduct electrically charged ions between them. In contrast to a battery, however, a fuel cell will continue to produce electric power as long as fuel and oxidant are supplied to the anode and cathode, respectively.

In order to produce a useful amount of power, individual fuel cells are typically arranged in stacked relationship in series with an electrically conductive separator plate between each cell. A fuel cell stack may be categorized as an internally manifolded stack or an externally manifolded stack. In an internally manifolded stack, gas passages for delivering fuel and oxidant are built into the fuel cell plates themselves. In an externally manifolded stack, the fuel cell plates are left open on their ends and gas is delivered by way of manifolds or pans sealed to the respective faces of the fuel cell stack. The manifolds provide sealed passages for delivering fuel and oxidant gases to the fuel cells and preventing those gases from leaking either to the environment or to the other manifolds. In some fuel cell stack arrangements, the stack is placed in an enclosure and the enclosure environment represents one of the process gases. In such a system, at least three manifolds are required to provide inlet and outlet gas passages for the stack, each of which must be sealed to the stack. In any case, the manifolds must perform the above functions under the conditions required for operation of the fuel cell stack and for the duration of its life.

An important aspect of the performance of an externally manifolded fuel cell stack is the flow distribution of process gases, i.e. fuel and oxidant process gases, among multiple fuel cells so that the process gases are evenly distributed to each of the fuel cells in the stack. In particular, it is desired that in a stack of fuel cells, all of the fuel cells in the stack get about the same amount of gas flow therethrough for the electrochemical reaction and for the purpose of cooling the cells uniformly or in predetermined regions. In conventional externally manifold fuel cell assemblies, fuel cells that are disposed closest to the anode exhaust pipe receive more fuel gas flow than fuel cells disposed further away from the exhaust pipe. As a result, the fuel cells with less gas flow therethrough are subjected to greater overheating while fuel cells with more gas flow produce more electrochemical reactions and thus, more power. This uneven gas distribution leads to a decreased fuel cell stack lifespan.

Therefore, there is a need for an externally manifolded fuel cell stack for a greater control of the flow distribution of the gases to the fuel cells in the stack to more uniformly distribute the gas flow to all of the fuel cells in the stack. However, controlling of the fuel gas supply to individual fuel cells within the stack requires a complex piping and fuel delivery assembly. In addition, there is a need for controlling the distribution of fuel so as to provide cooling to the anode inlet area of the stack.

It is, therefore, an object of the present invention to provide a manifold assembly that is capable of controlling the gas flow distribution through the fuel cells in the stack.

It is a further object of the invention to provide a manifold assembly which has a simple construction and may be adjusted for a desired flow distribution profile.

At a system level, the fuel cell system may include multiple fuel cell stacks that operate from a single fuel source provided by a fuel intake assembly and/or a single oxidant source provided by an oxidant gas intake assembly and/or exhaust spent gas into a single exhaust assembly. In such a multiple fuel cell stack system, each stack requires a predetermined amount of fuel and/or a predetermined percentage of the fuel in air. As flow control valves are costly and fragile in the hot, corrosive environments that surround the fuel cell stacks, it is desirable to have a flow control assembly that does not depend on such costly, fragile valves.

It is, therefore, a further object of the invention to provide a baffling assembly that has a simple construction and is capable of controlling gas distribution to fuel cell stacks in a multiple fuel cell stack system.

SUMMARY OF THE INVENTION

In accordance with the principles of the present invention, the above and other objectives are realized in a manifold assembly for use with a fuel cell stack, the manifold assembly comprising an external manifold for abutting and sealingly enclosing a face of the fuel cell stack, wherein the manifold comprises an enclosure for one of: providing inlet gas to the fuel cell stack and receiving exhaust gas from said fuel cell stack; and one or more baffles disposed in the enclosure of the external manifold. The one or more baffles one of (a) controls gas flow distribution of the inlet gas from said enclosure to fuel cells of said fuel cell stack; and (b) controls direction of the exhaust gas flow within the enclosure.

In certain embodiments, the external manifold is an anode exhaust manifold for receiving anode exhaust gas from an anode outlet face of said fuel cell stack, and the enclosure of the manifold includes an opening adapted to face the anode outlet face of the fuel cell stack and through which anode exhaust gas is output from the anode outlet face into the enclosure when the manifold abuts the anode outlet face. In such embodiments, there is at least one exhaust outlet formed in the enclosure for outputting the anode exhaust gas from the manifold, and at least one baffle is disposed in the enclosure between the exhaust outlet and the opening in the enclosure so as to control the direction of the anode exhaust gas flow received from fuel cells closest to the exhaust outlet around the baffle. In some embodiments, a height of the enclosure of the manifold is at least equal to or greater than a height of the fuel cell stack and the manifold assembly includes a plurality of baffles that are disposed in the enclosure along at least a portion of the enclosure's height. The baffles are disposed in the enclosure so as to control back pressure of the anode exhaust in predetermined fuel cells of the fuel cell stack and to reduce the amount of inlet fuel flow into the predetermined fuel cells. The predetermined fuel cells of the fuel cell stack include fuel cells that are closest to the exhaust outlet in the enclosure of the manifold and fuel cells that receive greater inlet fuel flow than other fuel cells in the fuel cell stack when the fuel cell stack is used with another manifold assembly without the baffles.

In some embodiments, the enclosure of the manifold includes an outer wall opposing the opening, opposing top and bottom walls connected to the outer wall and first and second opposing sidewalls connected to the outer wall and to the top and bottom walls. Each of the baffles includes first and second opposing ends that are coupled with the first and second sidewalls of the enclosure, respectively, and the baffles are successively disposed along a portion of the height of the enclosure with successive baffles being separated by a vent. In some embodiments, each of the baffles is curved toward the outer wall of the enclosure so that the baffles are concave with respect to the anode outlet face of the fuel cell stack when the manifold assembly abuts the anode outlet face. One or more support members may be used to support the baffles in the enclosure, and the support member(s) may be coupled to one of the top or bottom walls or to one or both of the sidewalls. In some embodiments, one or more of the baffles may include a vent, a perforation and/or an opening therein at one or more predetermined locations.

In certain embodiments, the external manifold is a cathode inlet manifold for enclosing a cathode inlet face of the fuel cell stack and for providing oxidant gas to the cathode inlet face. In such embodiments, at least one baffle controls gas flow distribution of the inlet oxidant gas from the enclosure to the fuel cells in the fuel cell stack so that portions of the fuel cells closest to an anode inlet face of the fuel cell stack receive increased flow of inlet oxidant gas when the manifold assembly abuts the cathode inlet face. Also, in such embodiments, the enclosure includes an outer wall, opposing top and bottom walls connected to the outer wall and opposing first and second sidewalls connected to the outer wall and to the top and bottom walls, with the first sidewall of the enclosure being disposed closest to an anode inlet face of the stack when the manifold assembly abuts the cathode inlet face of the stack. The at least one baffle in such embodiments extends along a portion of a width of the enclosure from the second sidewall of the enclosure in the direction of the first sidewall. The baffle may be substantially flat or may be curved, depending on the stack requirements.

A fuel cell assembly with the manifold assemblies described above, and a method of controlling the flow distribution of gas are also described. Moreover, fuel cell systems with multiple fuel cell stacks housed in an enclosure and one or more baffles for controlling the gas flow at the system level are also described.

BRIEF DESCRIPTION OF THE DRAWINGS

The above and other features and aspects of the present invention will become more apparent upon reading the following detailed description in conjunction with the accompanying drawings, in which:

FIG. 5 shows a graph of flow distribution through the fuel cell stack using the anode exhaust manifold assembly of FIGS. 2 and 4A-4B and the conventional anode exhaust manifold assembly at different stack heights;

FIGS. 6A and 6B show side and top schematic views of an alternative embodiment of fuel cell stacks which include the anode exhaust manifold assembly and a cathode inlet manifold assembly.

DETAILED DESCRIPTION

Figure 1:
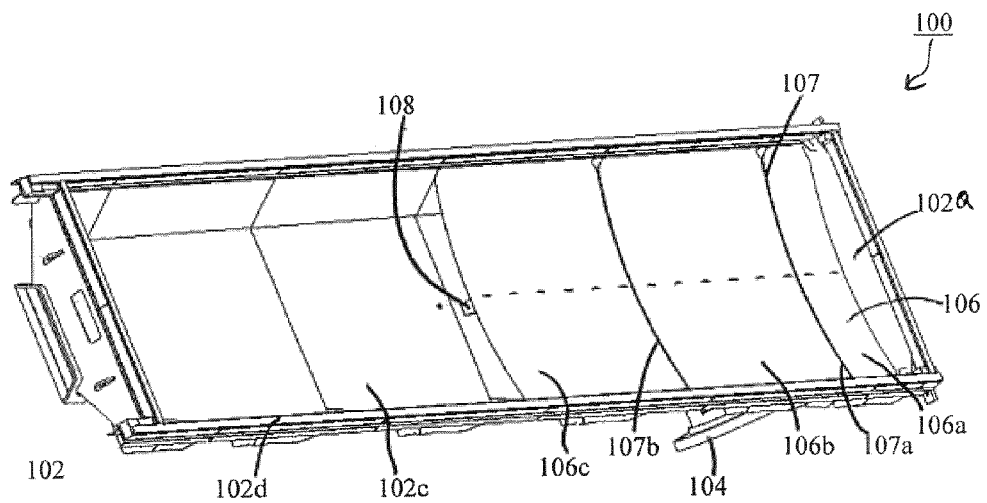
FIG. 1 is perspective view of an embodiment of an anode exhaust manifold assembly of the present invention.

The present invention provides a manifold assembly for use in a fuel cell system which controls gas flow distribution through a fuel cell stack of the system so as to achieve more uniform gas flow distribution through each fuel cell in the stack and to provide cooling to desired areas of the stack, such as the anode inlet area of the stack. FIGS. 1-3C show illustrative embodiments of an anode manifold assembly 100 for use in the fuel cell system and for controlling the gas flow distribution through the fuel cell stack. The anode manifold assembly 100 shown in FIGS. 1-3C is used with, or as part of, a fuel cell stack that comprises a plurality of stacked fuel cells and, in some cases, hundreds of stacked fuel cells. The fuel cell stack includes anode inlet and outlet faces for receiving and outputting, respectively, fuel gas and anode exhaust, and cathode inlet and outlet faces for receiving and outputting, respectively, oxidant gas and cathode exhaust. Each of the cathode inlet, anode inlet and anode outlet faces of the stack are typically enclosed by a manifold or a manifold assembly, so that oxidant gas and fuel gas are delivered through the respective manifolds abutting the cathode inlet and anode inlet faces, respectively, and anode exhaust is output into the manifold abutting the anode outlet face. The anode manifold assembly 100 of FIGS. 1-3C is adapted to sealingly abut the anode outlet face of the fuel cell stack and to receive anode exhaust gas output by the stack.

Typically, in fuel cell stacks that include many fuel cells, it is not economical to provide each fuel cell with an individual gas flow control assembly, such as a valve, for controlling the amount of gas supplied to the individual fuel cell. Therefore, the whole fuel cell stack is fed with the fuel and oxidant gases, respectively, as a unit, with the fuel being supplied to the whole stack from the anode inlet manifold and the oxidant being supplied to the whole stack from the cathode inlet manifold. Similarly, the anode outlet manifold, such as the anode manifold assembly 100 of FIGS. 1-3C, receives the anode exhaust from the entire stack, and thereafter outputs the received anode exhaust for processing or for venting to the outside through an exhaust outlet. It is important for the performance of the stack that each fuel cell in the stack receives about the same amount of fuel and oxidant gases. Since, as discussed above, those fuel cells closest to the exhaust outlet receive the most gas flow and the fuel cells furthest from the exhaust outlet receive less gas flow, a flow regulation device or assembly is needed for regulating the gas flow, particularly the fuel flow, so that each fuel cell receives the same amount of gas flow regardless of its distance from the exhaust outlet. The anode manifold assembly of FIGS. 1-3C includes such a flow regulation assembly and is capable of adjusting the flow of fuel through the fuel cell stack so that the fuel flow is evenly distributed among the fuel cells in the stack.

As shown in FIGS. 1-3C, the anode manifold assembly 100 includes an external anode exhaust manifold 102 which, when used with the fuel cell stack, abuts the anode outlet face of the stack. The anode exhaust manifold 102 includes an exhaust outlet 104 disposed at one end 102a of the manifold 102, and one or more baffles 106 disposed adjacent to, or near, the end 102a of the manifold 102. The anode manifold 102 forms a compartment or an enclosure for enclosing the anode outlet face of the fuel cell stack and for receiving the anode exhaust gas from the fuel cell stack, and the enclosure has an opening through which the anode exhaust is received from the anode outlet face. An illustrative configuration of the anode manifold 102 is disclosed in U.S. Pat. No. 6,877,611, assigned to the same assignee herein, the entire disclosure of which is incorporated herein by reference.

In the present illustrative embodiment, the manifold 102 includes an outer wall 102c which opposes the opening in the manifold, opposing top and bottom walls coupled to the outer wall 102c and opposing side walls coupled with the outer wall and the top and bottom walls. Outer ends of the top and bottom walls and of the sidewalls form an abutting surface 102d of the manifold that abuts the anode outlet face of the stack. The exhaust outlet 104 in the embodiment shown in FIGS. 1-3C is formed in the outer wall 102c and is disposed near an end 102a of the manifold 102 which abuts the positive end or the negative end of the fuel cell stack. However, in other embodiments, the exhaust outlet 104 may be disposed in any other area of the manifold.

As shown, the one or more baffles 106 are arranged in the anode exhaust manifold 102 within the space between the outer wall 102c of the manifold 102 and the abutting surface 102d of the manifold 102 which is adapted to abut the anode exhaust face of the fuel cell stack. The one or more baffles 106 are disposed near the exhaust outlet 104 pipe in the outer wall 102c of the manifold 102. In particular, the one or more baffles 106 are strategically disposed in or near the regions of the manifold where there is greater gas flow, which is typically near the exhaust outlet 104. In order to achieve more uniform distribution of inlet fuel to all of the fuel cells in the stack, the baffles are disposed in the enclosure of the manifold so as to control back pressure of the anode exhaust gas output from predetermined fuel cells of the fuel cell stack and to reduce the amount of inlet fuel flow into these predetermined fuel cells. The predetermined fuel cells of the stack include fuel cells that are closest to the exhaust outlet in the manifold and fuel cell receiving greater inlet fuel flow than other fuel cells in the stack when the stack is used with a conventional manifold that does not include baffles.

As shown in FIGS. 1-3C, the one or more baffles 106 extend along a portion of the height of the manifold 102. However, in some embodiments, depending on the configuration of the manifold 102 and the number of and location of the exhaust outlet 104, the one or more baffles 106 may extend along the entire height of the manifold 102. In certain embodiments, the baffles 106 are formed from one or more stainless steel sheets. However, other materials which have similar thermal expansion coefficients to that of the manifold and which have sufficient strength at high temperature may be used for the baffles.

The embodiments of FIGS. 1-3C include several baffles 106 disposed successively in the enclosure of the manifold along at least a portion of the height of the manifold with vents or spaces 107 between adjacent or successive baffles 106. The vents 107 between adjacent baffles 106 are provided in the areas of the manifold where more flow is needed, so as to effectively control of the gas flow through the fuel cell stack. Although not shown in FIGS. 1-3C, the baffles may also include vents, perforations or openings in the baffles themselves, which are provided at predetermined locations where additional flow is needed, so as to further control the gas flow through the fuel cell stack.

Figure 2:
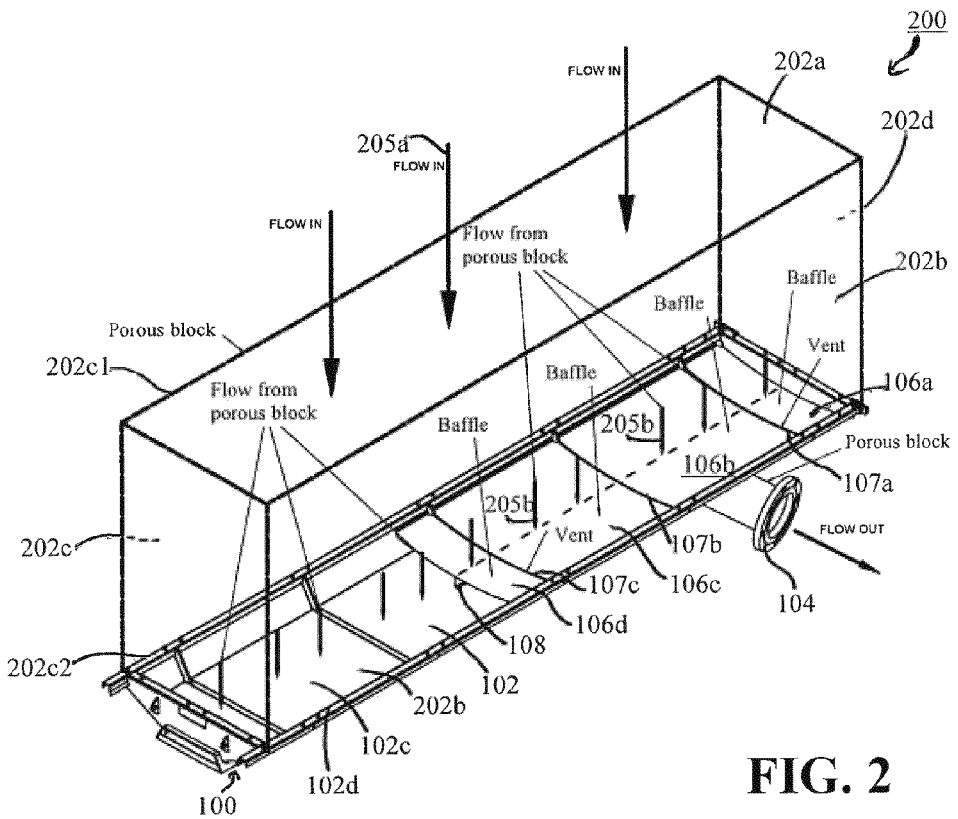
FIG. 2 is schematic view of another embodiment of the anode exhaust manifold assembly used with a fuel cell stack.

FIGS. 1 and 2 show the illustrative embodiments of the anode outlet manifold assembly which include three or four baffles 106 of varying sizes disposed in the manifold 102 near the exhaust pipe that forms the exhaust outlet 104. In the embodiment of FIG. 1, the anode outlet manifold assembly includes first, second and third baffles 106a-c, while in the embodiment of FIG. 2, the anode outlet manifold assembly includes first, second, third and fourth baffles 106a-d, with the first, second and third baffles 106a-c having the same or similar configuration as the baffles 106a-c of FIG. 1. As shown in FIGS. 1 and 2, each of the baffles 106a-c or 106a-d is positioned in the manifold so that it extends across the width of the manifold 102, from one sidewall to the other sidewall. As shown, each baffle includes two opposing ends which are coupled to the opposing sidewalls of the manifold. In the illustrative embodiments shown, opposing ends of each baffle are connected to the respective sides of the manifold, within the manifold 102. Moreover, each of the baffles 106a-d has at least a slight curvature thereto, curving toward the outer wall of the manifold, so that the baffles are concave with respect to the fuel cell stack face. In particular, for high temperature fuel cell operation, curved baffle structures are desired because they warp in a predictable manner during high-temperature operation, and do not interfere with other machine structures. However, in other embodiments, flat or convex baffles may be used.

As shown, a support structure or rib 108 may be included for supporting the baffles within the manifold 102. As shown in FIG. 2, the support structure 108 extends from the end 102a of the manifold along the central areas of the baffles 106 and is connected to the manifold-side surfaces of the baffles 106 so as to provide support for the baffles 106. The attachment line of the support rib 108 is shown in FIG. 2 by a broken line 205c. The support rib may be coupled to one of the top and bottom walls of the manifold. Although the illustrative embodiments shown include only one support structure 108, in other embodiments, additional support structures may be used, or no support structure may be used, depending on the size of the baffles and the manifold requirements. Also, in some embodiments, the support rib may be attached to other areas of the manifold and/or may be attached to the fuel cell side surface of the baffles instead of the manifold-side surfaces.

As shown in FIGS. 1 and 2, the baffles 106a-d are installed in the compartment or enclosure formed by the manifold between the outer wall 102a of the manifold and the stack-abutting face 102d of the manifold. The baffles 106a-d are connected to the sidewalls of the manifold at a predetermined distance from the sidewall ends that form the stack-abutting face 102d of the manifold. The predetermined distance is such that the baffles 106a-d do not create excessive pressure at the anode outlet face of the stack and so that only a minor pressure penalty is incurred by the use of the baffles in the manifold 102. In the present illustrative embodiment, the predetermined distance from the sidewall ends abutting the anode outlet stack face to the point of connection of the baffles to the manifold sidewalls is 1 inch. However, in other embodiments, the predetermined distance may vary depending on the depth of the manifold and the size of the fuel cell stack.

In the illustrative embodiments shown in FIGS. 1 and 2, the first baffle 106a is disposed at or near the outlet end 102a of the manifold and has a smaller height than the second and third 106b, 106c baffles. The second baffle 106b is positioned adjacent the first baffle 106a with a slot or a vent 107a formed therebetween, and the third baffle 106c is positioned adjacent the second baffle 106b with a slot or a vent 107b therebetween. The heights of the second and third baffles 106b, 106c are greater than that of the first baffle 106a and of the fourth baffle 106d because the second baffle 106b is disposed directly opposite, or facing, the exhaust outlet 104 and the third baffle 106c is disposed near the exhaust outlet 104, and correspond to the locations of the fuel cell stack which typically receive greater gas flow. Such positioning of the second and third baffles 106b and 106c reduces inlet gas flow through the fuel cells corresponding to the locations of the baffles and increases inlet gas flow through fuel cells in other areas of the stack, thereby controlling the gas flow to provide more uniform gas flow throughout the stack.

In FIG. 2, the fourth baffle 106d is disposed adjacent the third baffle 106c with a vent or a slot 107c therebetween. The height of the fourth baffle 106d in this illustrative embodiment is smaller than the heights of the second and third baffles and is similar to the height of the first baffle 106a. Although the embodiment shown in FIG. 1 does not include the fourth baffle 106d, it is understood that the configuration of the anode outlet manifold assembly of FIG. 1 may be varied so as to include the fourth baffle 106d following the third baffle 106c, similar to the embodiment shown in FIG. 2.

Figure 4A:
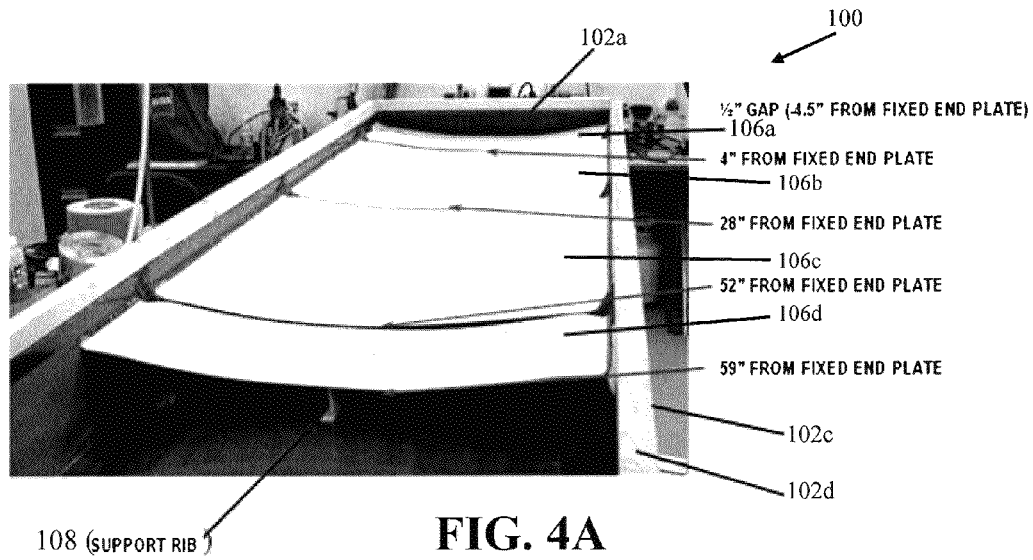
FIGS. 4A and 4B show installation of baffles into the anode exhaust manifold to form the anode exhaust manifold assembly of FIGS. 1 and 2.
Figure 4B:
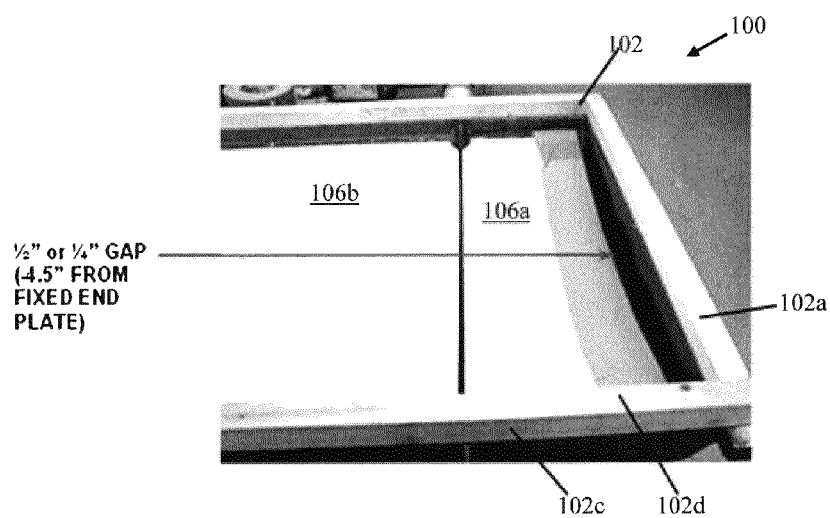

FIGS. 4A and 4B show photographs of the baffles 106a-d installed in the enclosure of the manifold 102 of the anode manifold assembly of FIG. 2. The installation of the baffles 106a-d in the anode manifold assembly of FIG. 1 is similar, with the fourth baffle 106d being omitted from the anode manifold assembly of FIG. 1. As shown in FIGS. 4A and 4B, the first baffle 106a is installed adjacent to the outlet end 102a of the manifold and extends beyond a fixed end plate of the fuel cell stack which the manifold 102 would abut. In the present illustrative embodiment, there is a ¼ or a ½ inch gap between the outlet end 102a of the manifold and the first baffle 106a, and the first baffle is positioned at 4.5 inches outside of the fixed end plate. The height of the first baffle is about 7 inches. The second baffle 106b is installed at a position adjacent or successive to the first baffle 106a along the height of the stack, about 4 inches from the fixed end plate of the stack that the manifold 102 would abut. As shown, there is a slot or a vent 107a between the first baffle 106a and the second baffle 106b, which has a height of about ¼ inches. The height of the second baffle 106b is about 23.5 inches.

As shown in FIG. 4A, the third baffle 106c is installed at a position adjacent or successive to the second baffle along the height of the stack and about 28 inches from the fixed end plate of the stack that the manifold 102 would abut. There is a slot or a vent 107b formed between the second baffle 106b and the third baffle 106c, which has a height of about ¼ inches. The height of the third baffle is about 24.5 inches. Finally, the fourth baffle 106d is installed at a position adjacent or successive to the third baffle along the height of the stack that is about 52 inches from the fixed end plate of the stack that the manifold would abut, and extends to a position that is about 59 inches from the fixed end plate of the stack. The height of the fourth baffle 106d is about 7 inches. There is also provided a vent or a slot 107c between the third and fourth baffles 106c, 106d which has a height of about ¼ inches. In the embodiment shown, after the fourth baffle 106d, the space in the manifold is open to its outer wall 102c without further baffles, and exhaust is free to flow within the manifold to an area between the baffles 106 and the manifold outer wall 102c toward the exhaust outlet 104. The baffle arrangement shown in FIGS. 4A and 4B is suitable for anode manifold assemblies used with 300 kW fuel cell stack systems, such as DFC®300 manufactured by FuelCell Energy, Inc. However, it is understood that the number of the baffles used in the anode manifold assembly and their arrangement may be varied depending on the dimensions and requirements of the manifold and of the fuel cell system.

Referring now to FIG. 2, the flow of the fuel through the fuel cell system 200 with the manifold assembly 100 is shown using arrows. As shown in FIG. 2, the fuel cell system 200 includes a fuel cell stack 202 that has an anode inlet face 202a adapted to receive fuel gas, an anode outlet face 202b which opposes the anode inlet face 202a and which is adapted to output anode exhaust, a cathode inlet face 202c adapted to receive oxidant gas and a cathode outlet face 202d adapted to output cathode exhaust. The fuel cell stack 202 is schematically shown as a porous block, which is formed by the plurality of stacked fuel cells. The anode manifold assembly 100 abuts the anode outlet face 202b of the fuel cell stack 202 and has a similar construction to the manifold assembly of FIGS. 4A and 4B, and similar to the manifold assembly of FIG. 1, with the exception of the added fourth baffle 106d. Although not shown in FIG. 2, the fuel cell stack 202 may also include an anode inlet manifold abutting the anode inlet face 202a, a cathode inlet manifold abutting the cathode inlet face 202c and in some embodiments a cathode outlet manifold abutting the cathode outlet face 202d.

The flow of fuel into the fuel cell stack 202 is shown in FIG. 2 by the arrows 205a labeled as "flow in". In particular, the fuel cell stack 202 receives fuel through the anode inlet face 202a, which is typically delivered via the anode inlet manifold. After the fuel is used in the fuel cell stack, the fuel cells of the stack output anode exhaust, comprising spent fuel gas, through the anode outlet face 202b into the anode manifold assembly 101. The flow of anode exhaust from the anode outlet face 202b of the stack is shown using smaller arrows 205b in FIG. 2.

The flow of anode exhaust 205b leaving the fuel cells in the area of, or in proximity of, the exhaust outlet 104 is redirected by the baffles 106 of the anode manifold assembly 100 so that the anode exhaust flows around the baffles and/or through the vents 107 between the baffles. That is, the anode exhaust flow from the stack to the exhaust outlet 104 is caused by the baffles 106 to travel over and then under the baffle plates and/or to pass through the strategically placed vents between adjacent or successive baffles. In this way, the baffles 106 restrict the flow of the anode exhaust in the area of the exhaust outlet 104, and reduce the pressure drop across the fuel cells located in the area of, or proximity with, the exhaust outlet 104. As a result, the pressure drop across the fuel cells in the area of the exhaust outlet 104 is more uniform with the pressure drop across the fuel cells disposed farther away from the exhaust outlet, thereby creating a more uniform distribution of fuel flow through the fuel cells in the stack, independent of how closely or far away the fuel cells are located relative to the exhaust outlet in the manifold.

As mentioned above, in some embodiments, the baffles 106 may also have vents, perforations and/or other openings formed in the baffles themselves (not shown) and strategically placed so as to control the flow and direction of the anode exhaust to the exhaust outlet. In such embodiments, the anode exhaust flow from the stack to the exhaust outlet in the area of the exhaust outlet would also travel through such vents, perforations or openings in the baffles. The vents, perforations and/or openings in the baffles provide for additional control of fuel flow and fuel flow distribution through the fuel cell stack.

Figure 3A:
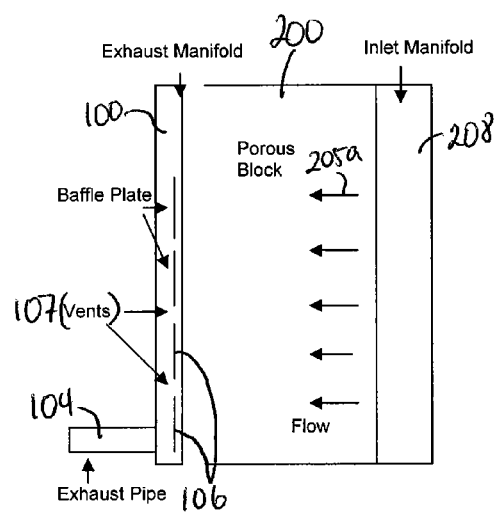
FIGS. 3A-3C show side, top and front schematic views of the fuel cell stacks including the anode exhaust manifold assembly.
Figure 3C:
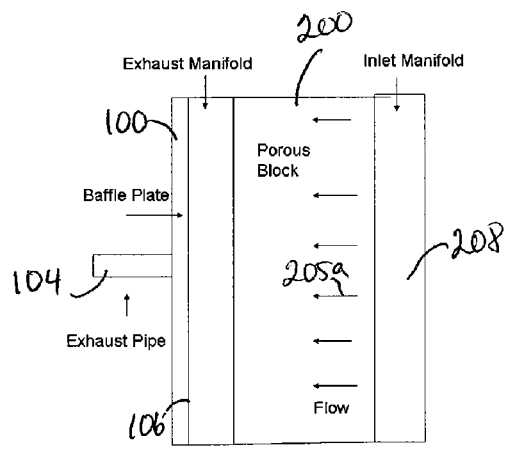
Figure 3B:
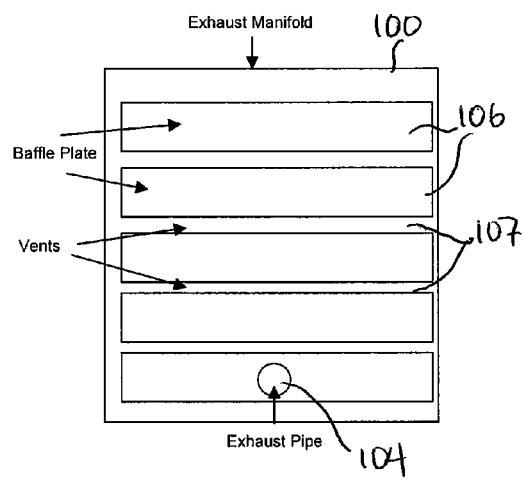

FIGS. 3A, 3B and 3C schematically show side, front and top views of the anode manifold assembly 100 abutting the fuel cell stack 200, shown as a porous block. As shown in FIGS. 3A-3C, the fuel cell stack 200 also includes an inlet manifold 208 through which fuel is supplied to the fuel cell stack 200. The flow of fuel is shown in FIGS. 3A and 3C using arrows 205a. As shown in FIGS. 3A and 3B, the anode manifold assembly 100 includes a plurality of baffles, i.e. four or five baffles, which are disposed in the area of the exhaust outlet 104 so as to restrict the flow of anode exhaust leaving the fuel cell stack in the area of the exhaust outlet 104, and as a result, control the flow of fuel into the fuel cells of the stack so that the fuel is more uniformly distributed among the fuel cells of the stack.

FIG. 5 shows a graph of gas flow distribution in fuel cell stacks with conventional anode exhaust manifolds and in fuel cell stacks with the manifold assembly of the present invention, such as the manifold assemblies shown in FIGS. 2 and 4A-4B. In FIG. 5, the X-axis represents stack height percentage, or the position of the fuel cells along the height of the fuel cell stack, while the Y-axis represents the measured flow of fuel through the fuel cells. A plot of the fuel flow distribution through the fuel cell stack with a conventional manifold assembly, without any baffles, is labeled as "No Baffle," while plots of the fuel flow distributions through fuel cell stacks that included the anode manifold assembly of the present invention are labeled as "With Baffle."

As can be seen, the flow distribution in the conventional fuel cell stacks with conventional manifolds varies from one end of the stack to the other end of the stack, so that the fuel flow is greatest in the area of 0-10% of the stack height, corresponding to the area closest to the anode exhaust outlet, and lowest in the area of 80-100% of the stack height, corresponding to the area furthest away from the anode exhaust outlet. In contrast, the flow distribution of the fuel in the fuel cell stacks that used the anode manifold assembly of the present invention abutting the anode outlet face of the stack was substantially uniform throughout the stack, and varied only slightly from one area to another. It is further noted that the slight variations in the fuel flow distribution may be corrected by using strategically placed vents in the area of 20-30% of the stack height and/or strategically placed additional baffles in the area of 55-75% of the stack height.

In some embodiments, baffles may be employed in other manifold assemblies so as to further control the flow of gases through the fuel cell stack and to control the temperature in the stack. In particular, one or more baffles may be used in a cathode inlet manifold assembly, which is adapted to abut the cathode inlet face of the stack, in order to control the flow of oxidant gas into the fuel cell stack and to control the temperature in the fuel cell stack.

As shown in FIG. 2, the cathode inlet face 202c of the stack is substantially perpendicular to the anode inlet face 202a of the stack, and a portion of the cathode inlet face 202c1 extends along the anode inlet 202a while a portion of the cathode inlet face 202c2 extends along the anode outlet face 202b. During fuel cell operation, cooling is needed in the anode inlet region of the stack and uniform cathode exhaust temperatures along the height of the stack are desired. Such temperature characteristics may be achieved by controlling the flow of oxidant gas to the fuel cell stack so as to provide greater oxidant flow to the area of the cathode inlet 202c1 that is near the anode inlet portion of the stack. This oxidant gas flow control may be achieved by providing one or more baffles in the cathode inlet manifold, and in particular, by positioning the one or more baffles in the cathode inlet manifold so that the area of the cathode inlet face that is adjacent or near the anode inlet of the stack receives greater oxidant flow. In the illustrative embodiments shown, the one or more baffles are positioned in the cathode inlet manifold in the area of the cathode inlet 202c2 that is near the anode outlet so as to provide an opening in the area of the cathode inlet 202c1 near the anode inlet.

FIGS. 6A and 6B schematically show the side and top views of the fuel cell stack 200 that includes both the anode manifold assembly 100 of FIGS. 1-4A and a cathode inlet manifold assembly 300 abutting the cathode inlet face 202c of the stack. The construction of the anode manifold assembly 100 in this embodiment is the same as in the above-described embodiments, and thus, a description of the anode manifold assembly 100 is omitted. As shown in FIGS. 6A and 6B, the cathode inlet manifold assembly 300 includes a cathode inlet manifold 302 abutting and enclosing the cathode inlet face 202c of the stack 200. The cathode inlet manifold 302 forms an enclosure or a compartment for receiving oxidant gas and supplies the oxidant gas to fuel cell cathodes of the fuel cell stack. The manifold 302 may have a construction as described in U.S. Pat. No. 6,887,611, assigned to the same assignee herein and incorporated herein by reference. In particular, the manifold 302 includes an outer wall, opposing top and bottom walls connected to the outer wall and opposing sidewalls 302a, 302b connected to the outer wall and to the top and bottom walls.

As shown in FIGS. 6A and 6B, the cathode inlet manifold assembly 300 includes an oxidant inlet 304 and one or more baffles 306 for controlling the flow of oxidant gas from the oxidant inlet 304 through the enclosure of the manifold 302 and to the fuel cell stack. In the embodiment shown, the cathode inlet manifold assembly 300 includes one baffle 306 which extends from a first sidewall 302a of the manifold 302, which extends along the fuel outlet side of the stack, and toward the opposing second sidewall 302b of the manifold 302, which extends along the fuel inlet side of the stack. The baffle 306 extends only part of the way from the first side 302a to the second side 302b, so as to create an opening 307 along the second side 302b of the manifold enclosure. The baffle 306 may be supported using one or more support members 308 which, in FIG. 6A, connect an end of the baffle 306 to the second sidewall 302b of the manifold so as to provide support to the baffle 306.

During operation, oxidant gas supplied to the cathode inlet manifold 302 through the inlet 304 is directed by the baffle 306 to travel along and around the baffle before reaching the fuel cell stack 200. Since the opening 307 extends along the second sidewall of the manifold 302b which is adjacent the fuel inlet side of the stack, more oxidant gas flow is provided to areas of the fuel cells at or near the opening 307. In this way, additional cooling is provided to the fuel inlet area of the fuel cell stack through heat exchange between the oxidant flow through the cathodes near the fuel inlet area of the stack and fuel flow through the inlet area of the anodes. Although not shown in FIGS. 6A and 6B, other openings or perforations in the baffle may be provided and disposed strategically so as to provide further cooling to other areas of the stack, as needed. Moreover, although the embodiment shown in FIGS. 6A and 6B only includes one baffle 306, multiple baffles may be used so as to provide desired oxidant flow control.

Figure 7A:
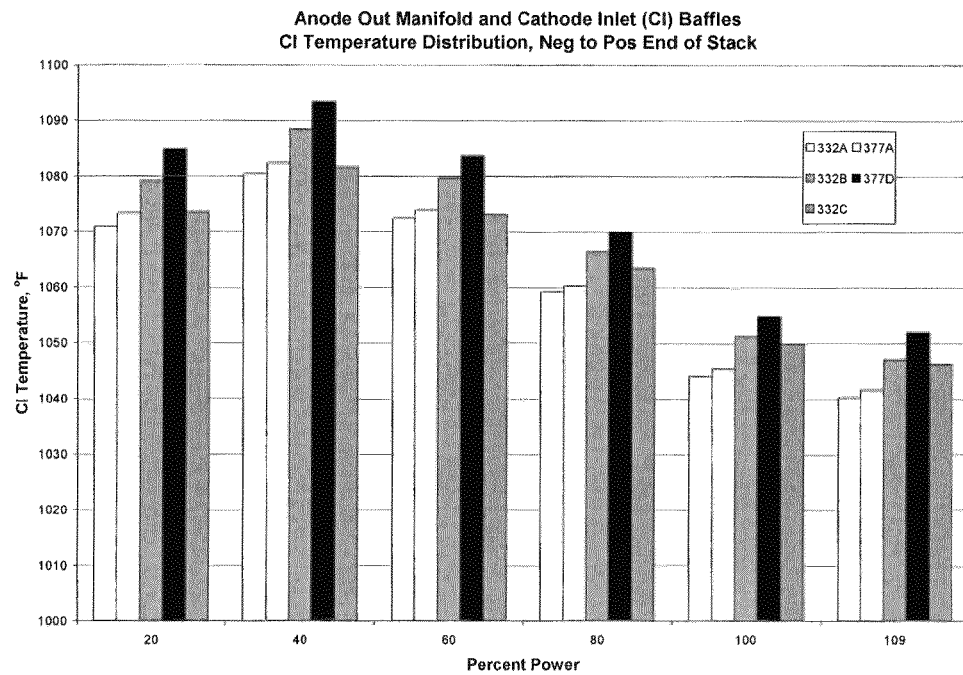
FIG. 7A shows a bar graph of cathode exhaust temperature distribution in the fuel cell stacks of FIGS. 6A and 6B.
Figure 7B:
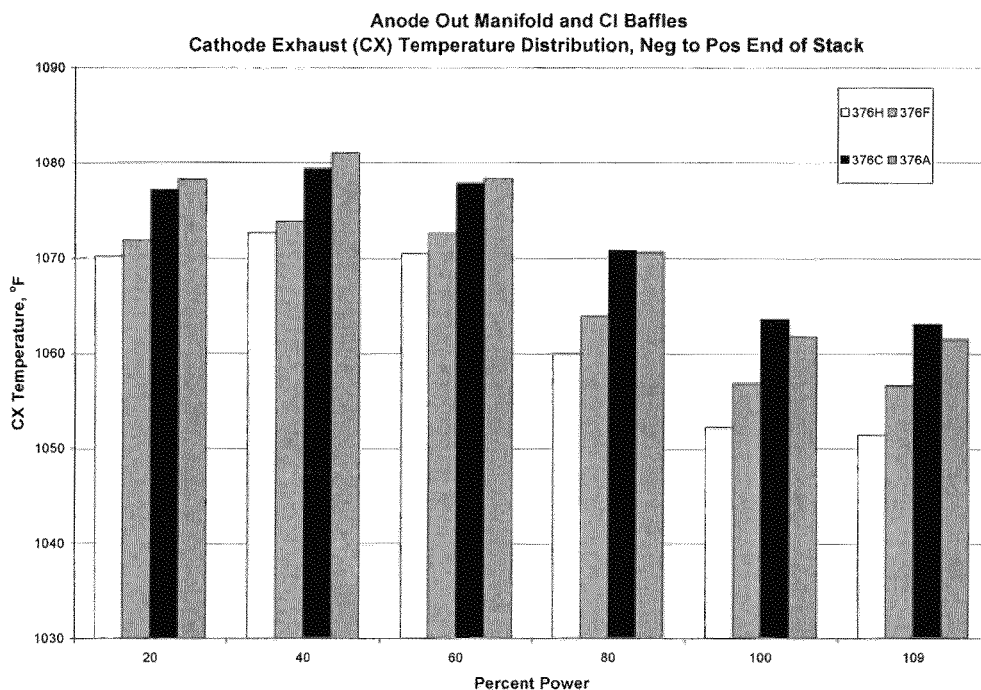
FIG. 7B shows a bar graph of cathode inlet temperature distribution in the fuel cell stacks of FIGS. 6A and 6B.
Figure 7C:
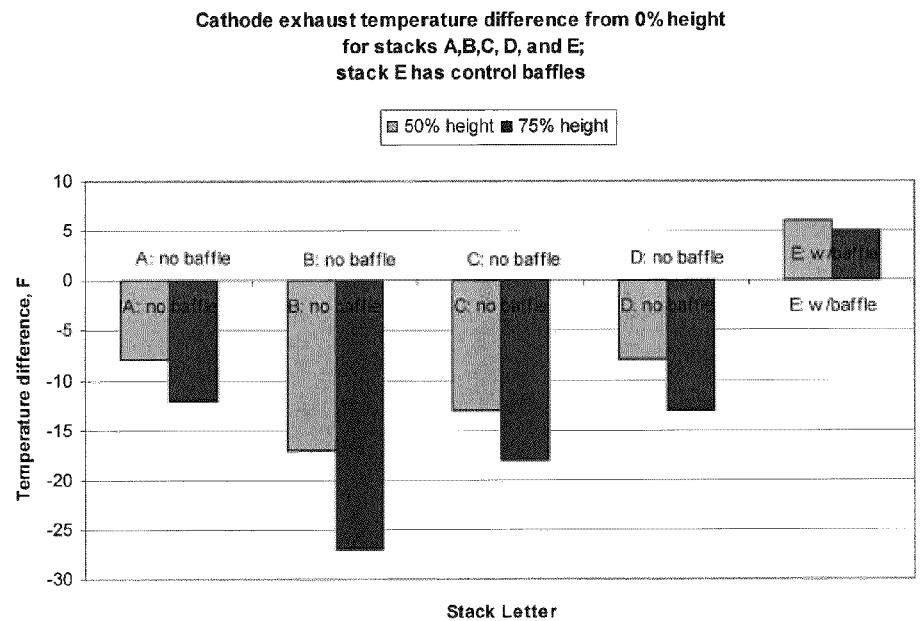
FIG. 7C shows a bar graph comparing average cell temperatures at 50 percent and 75 percent stack height to the 0 percent stack height cell temperature for four fuel cell stacks without control baffle assemblies and a fifth stack that includes the flow control baffle assemblies of FIGS. 6A and 6B.

The effects of the baffles 106 and 306 of the anode manifold assembly 100 and of the cathode inlet manifold assembly 300, respectively, is shown in FIGS. 7A, 7B, and 7C. In particular, FIGS. 7A and 7B show cathode exhaust and cathode inlet temperature distributions from negative to positive ends of the fuel cell stack which uses the cathode inlet manifold assembly 300 of FIGS. 6A and 6B abutting its cathode inlet face and the anode manifold assembly 100 of FIGS. 2 and 4A-4B abutting its anode outlet face. between In FIGS. 7A and 7B, the X-axis represents the percent power level at which the fuel cell stack operates and the Y-axis represents the measured temperature in degrees F. In FIGS. 7A and 7B, each group of bars, i.e. groups of four bars in FIG. 7A and groups of five bars in FIG. 7B, represents different positions within the stack, extending from a negative end of the stack, i.e. left-most bar in each group, to a positive end of the stack, i.e. right-most bar in each group.

FIG. 7C shows a comparison between four conventional stacks, i.e. stacks A, B, C, and D, that do not include any baffles in their manifolds, and a fifth stack, i.e. stack E, that has both the anode manifold assembly 100 of FIGS. 2 and 4A-4B and the cathode inlet manifold assembly 300 of FIGS. 6A and 6B. In FIG. 7C, the X-axis represents the five different stacks, listed as A, B, C, D, and E, and the Y-axis represents the fuel cell cathode exhaust temperature difference from the lowest or zero percent height fuel cell in the fuel cell stacks. The 0% height fuel cell corresponds to the fuel cell at the negative end of the fuel cell stack. In FIG. 7C, each stack A-E includes a measurement of the cathode exhaust temperature difference between the 50% stack height position and the 0% stack height position and a measurement of the cathode exhaust temperature difference between the 75% stack height position and the 0% stack height position.

As shown in FIG. 7A, the temperature of the cathode exhaust output from the fuel cell stacks tested had a variation of about 10 degrees F. from the negative end of the stack to the positive end of the stack at different current densities. This temperature distribution is the opposite of the temperature distribution typically seen in fuel cells that use conventional manifolds without any baffles. In addition, as shown in FIG. 7A, the highest temperature of the cathode exhaust was typically output from the middle of the fuel cell stack, as shown by the bar labeled 376C.

As shown in FIG. 7B, the temperature of the oxidant gas in the cathode inlet areas of the fuel cell stack tested had a variation of about 12 degrees F. from the negative end to the positive end, which is within typical range of variation seen in fuel cell stacks with control baffles present in the manifolds. In addition, a lower cathode inlet temperature was observed near the negative end of the fuel cell stack.

As shown in FIG. 7C, in the fuel cell stacks without control baffles in their manifolds, i.e. stacks A, B, C, and D, the cathode exhaust temperature typically decreases with respect to the cathode exhaust temperature of the lowest fuel cell or 0% height cell in the stack. As shown, in stacks A, B, C and D, the cathode exhaust temperature at the 50% stack height is typically 8° F. to 13° F. lower than at the 0% height of the stack, and can be more than 15° F. lower than at the 0% height of the stack in an extreme case of the stack B. In stacks A, B, C and D, the cathode exhaust temperature at the 75% stack height is typically 13° F. to 18° F. lower than at the 0% stack height, and can be more than 25° F. lower than at the 0% stack height in an extreme case of the stack B. FIG. 7C also shows the temperature difference measured for stack E, which has both cathode inlet manifold assembly with control baffles and anode manifold assembly with the anode exhaust control baffles. The result for stack E shows that the temperature of the cathode exhaust from fuel cells at the 50% and 75% stack height are 5° F. to 6° F. higher than the cathode exhaust temperature at the 0% stack height. In further arrangements of the baffles in the anode manifold assemblies and the cathode exhaust manifold assemblies, the cathode exhaust temperature difference between a fuel cell at any height in the stack and the negative end fuel cell at the 0% height of the stack can be brought to 4° F. or less.

The observations shown in FIGS. 7A, 7B and 7C and particularly, the observations with respect to the cathode exhaust temperatures, show that the baffles 106, 306 used in the anode manifold assembly and in the cathode inlet manifold assembly, respectively, are capable of correcting the flow of oxidant gas through the stack as well as the temperature distribution in the stack. Variations in the dimensions of the baffles, and particularly in the heights of the baffles 106a-d of the anode manifold assembly, can produce increased uniformity in the temperatures within the stack. For example, in some embodiments, shorter baffles 106a-d, which have a combined height of 55 inches instead of 60 inches, would reduce the fuel flow to the free, unbaffled, end of the stack and are expected to improve the cathode exhaust temperature uniformity. In addition to providing more uniform temperatures in the stack, the baffle 306 of the cathode inlet manifold assembly also reduces the anode inlet area temperature.

Figure 8:
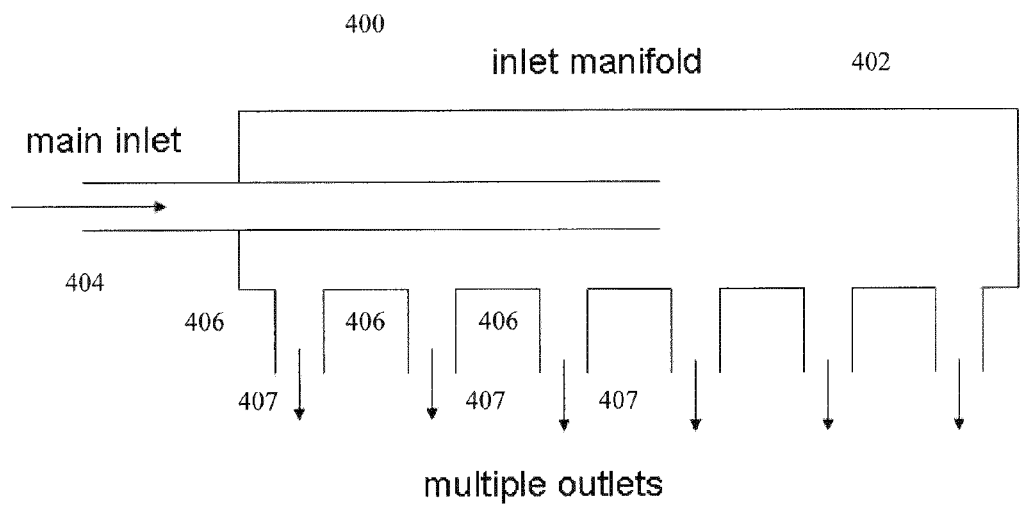
FIG. 8 shows a schematic view of a fuel and/or oxidant inlet manifold that may be used in a fuel cell stack in addition to or instead of the anode exhaust manifold assembly of FIGS. 1-4.

FIG. 8 schematically shows an alternative embodiment of an inlet manifold assembly 400, which may be used either as the cathode inlet manifold assembly 300 abutting the cathode inlet face of the stack or as an anode inlet manifold assembly abutting the anode inlet face of the stack. The inlet manifold assembly 400 includes an inlet manifold 402, which has a similar construction to conventional anode and cathode inlet manifolds and which is adapted to sealingly enclose an inlet face of the fuel cell stack. The inlet manifold 402 forms an enclosure or compartment for receiving inlet gas via an inlet pipe 404 that supplies the inlet gas to the inlet manifold 402. As shown in FIG. 8, the inlet pipe 404 extends into the manifold 402 and along at least a portion of the height of the manifold 402. The manifold 402 also includes one or more baffles 406 disposed within the enclosure of the manifold along the height of the manifold and forming a plurality of openings or outlets 407 between the baffles 406 for outputting the inlet gas from the enclosure of the manifold to the stack face. For high temperature applications, the baffles 406 may be formed from stainless steel.

In some embodiments, a barrier-type member may be installed within the enclosure instead of the baffles, with the barrier-type member covering all or a portion of the enclosure area and the barrier-type member including a plurality of outlets or openings formed therein. In this embodiment, the inlet gas received in the enclosure of the manifold is blocked by the barrier-type member from directly flowing to the fuel cell stack which the manifold abuts and instead is directed through the outlets or openings 407 formed in the barrier-type member to the stack face so as to provide a desired distribution. Like the baffles, the barrier-type member may be formed from a stainless steel sheet.

The positioning and number of the baffles 406 of the barrier-type member within the manifold enclosure will depend on the desired flow distribution and on whether the gas directed by the manifold is a fuel inlet gas or an oxidant inlet gas. For example, in some embodiments, the baffles or the barrier type member will extend along the entire width of the stack from one sidewall to another, while in other embodiments, the baffles or the barrier-type member will extend only along a portion of the stack width. Also, in the embodiment shown, the baffles or the barrier-type member is disposed along the entire height of the stack. However, in other embodiments, the baffles or the barrier-type member may be disposed only along a portion of the stack height.

In the embodiment shown in FIG. 8, the outlets or openings 407 formed between the baffles 406 or in the barrier-type member disposed in the manifold enclosure are provided at substantially uniform intervals so as to provide a more uniform distribution of the inlet gas to the stack face. However, in other embodiments, the outlets or openings 407 may be formed at varying intervals and in varying locations of the enclosure so as to provide customized flow distribution to the fuel cell stack. In this way, the flow distribution of the inlet gas to the stack may be adjusted so as to control the temperature within the stack, to more uniformly distribute the gas among the fuel cells in the stack, and to control the thermodynamic profile of the stack.

Figure 9A:
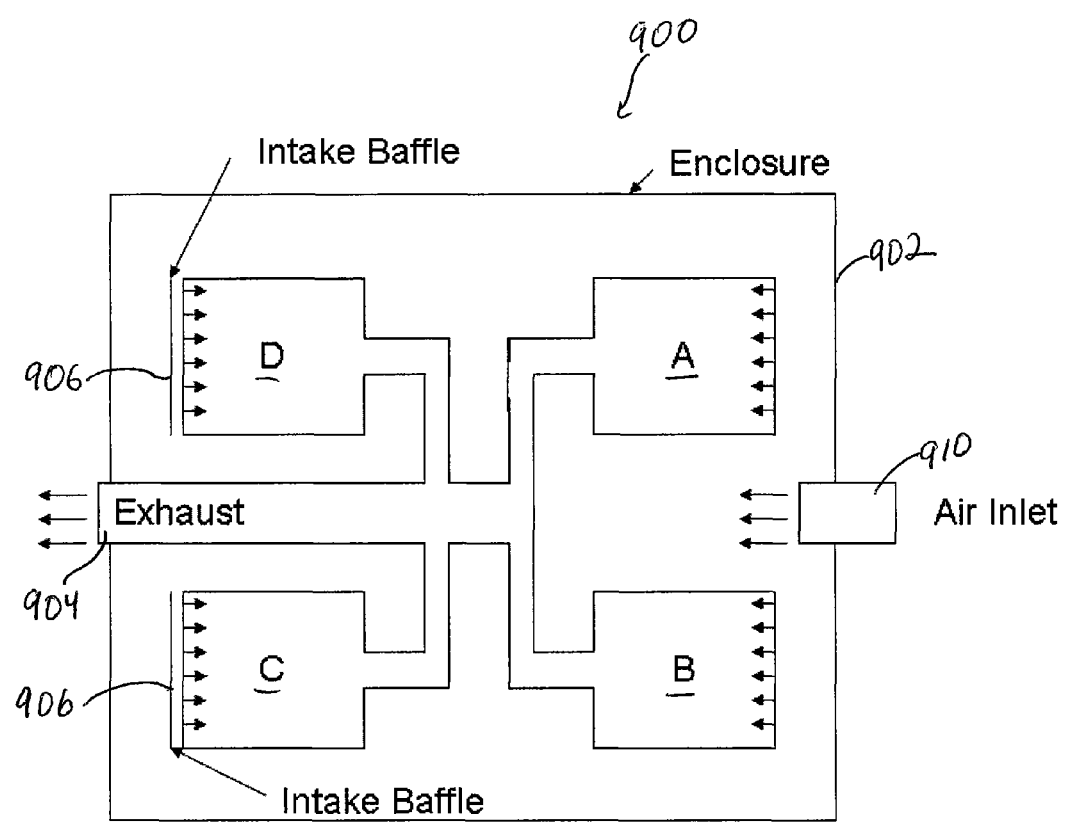
FIG. 9A, FIG. 9B, and FIG. 9C show illustrative embodiments of fuel cell systems with multiple fuel cell stacks in which baffles are used to control gas flow at the system level.
Figure 9B:
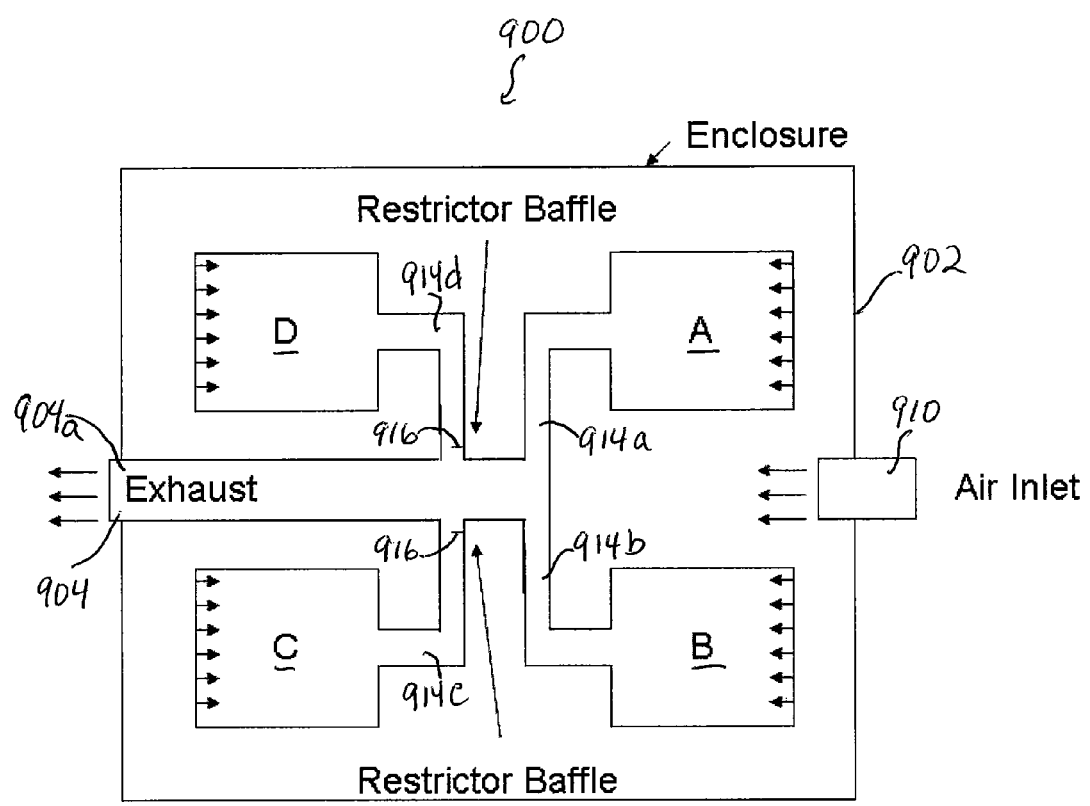
Figure 9C:
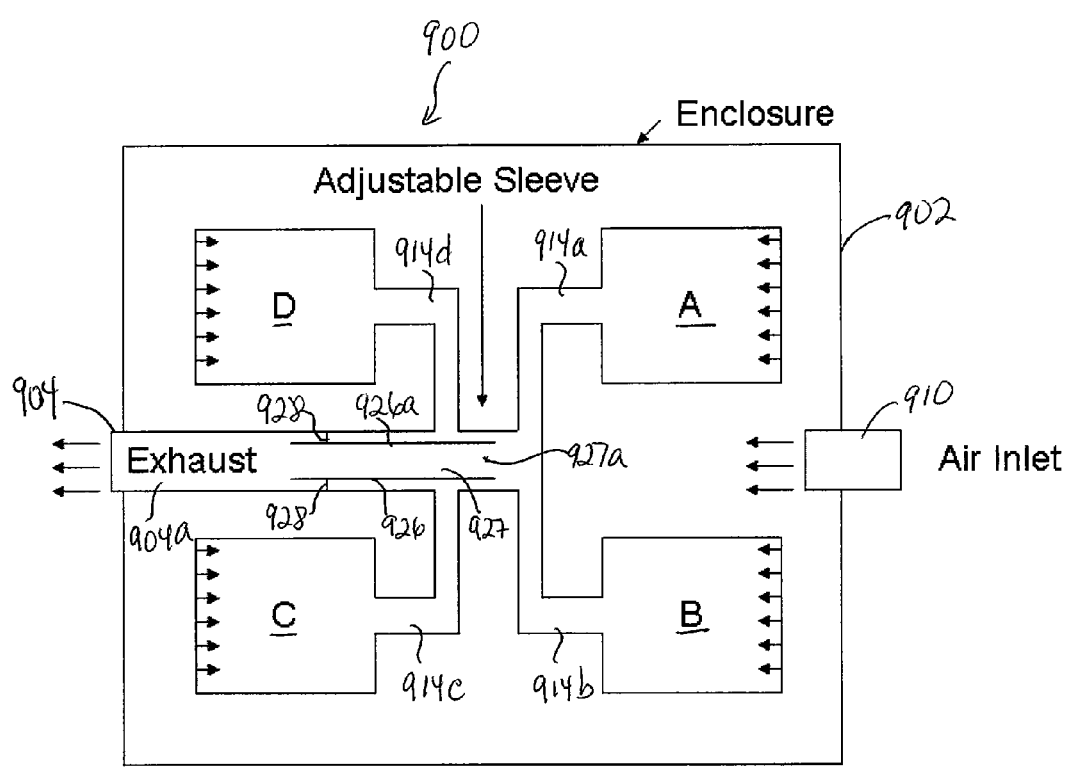

FIG. 9A, FIG. 9B, and FIG. 9C show illustrative embodiments of fuel cell systems 900 with multiple fuel cell stacks in which baffles are used to control gas flow at the system level rather than in individual fuel cell manifolds. FIG. 9A shows an asymmetric multi-stack fuel cell system 900 that includes four fuel stacks A-D within a common enclosure 902 and in which all of the stacks share a single air source via an air intake assembly 910 and a single asymmetric exhaust assembly 904. As shown, the fuel cell stacks are labeled A, B, C, and D respectively. In a conventional asymmetric multi-stack fuel cell system, it would be expected that each stack would draw different amounts of air. In particular, the exhaust flow path from the C-D stack pair is shorter than the exhaust path from the A-B stack pair, and thus, in a conventional asymmetric multi-stack fuel cell system, it would be expected that the C-D stack pair would draw more air flow than the A-B stack pair. In the system of FIG. 9A, the non-uniformity in the air flow to the stacks is corrected by strategically placing one or more baffles within the enclosure so as to increase resistance of the air flow to the stacks C and D. In the illustrative embodiment of FIG. 9A, the baffles 906 are disposed in front of the oxidant inlet faces of the fuel cell stacks C and D so that the air has to travel around these baffles 906 before reaching the oxidant inlet faces of the stacks C and D. This construction creates a pressure balance that, in turn, causes the stacks C and D to draw the same amount of air flow as the stacks A and B. The baffles 906 may have a substantially planar or flat construction, or may be convex or concave with respect to the oxidant inlet faces of the stacks. In the illustrative embodiment of FIG. 9A, the baffles 906 are formed from stainless steel sheets. Although the baffles 906 are shown as solid, it is understood that the baffles 906 may include openings, perforations or vents therein so as to control the flow of air in a predetermined manner. In addition, the distance of each baffle 906 from the oxidant inlet face of the stack C, D may be varied so as to create a predetermined pressure balance and to provide more uniform air flow distribution among the stacks. Moreover, although the embodiment 9A uses one baffle 906 in front of each oxidant inlet face of the stack C, D, it is also contemplated within the scope of the invention that multiple baffles may be used to provide the desired air flow distribution.

FIG. 9B shows another embodiment of the multi-stack fuel cell system 900, including stacks A, B, C and D housed within an enclosure 902 and supplied with air from a common air intake assembly 910 and having a common asymmetric exhaust assembly 904 for outputting the exhaust. The construction of the fuel cell system is substantially the same as the system shown in FIG. 9A, except for the way the baffles are employed. In FIG. 9B, instead of using the air intake baffles 906 used in FIG. 9A, the stack flow balance is corrected using restrictor baffles 916 strategically placed in the exhaust assembly 904. As shown in FIG. 9B, the exhaust assembly 904 includes a common exhaust outlet 904a coupled to each fuel cell stack A-D by an exhaust output line 914a-914b, wherein the exhaust output line 914a couples the exhaust output of the fuel cell stack A to the common exhaust outlet 904a, the exhaust output line 914b couples the exhaust output of the stack B to the common exhaust outlet 904a, the exhaust output line 914c couples the exhaust output of the stack C to the common exhaust outlet 904a and the exhaust output line 914d couples the exhaust output of the stack to the common exhaust outlet 904a.

As shown in FIG. 9B, the exhaust output lines 914c and 914d, i.e. exhaust pipes, have restrictor baffles 916 disposed therein. The restrictor baffles 916 comprise simple blockages placed in the exhaust pipes to restrict the flow of exhaust coming from the stacks C and D and thereby cause the flow of air through the stacks C and D to be restricted. In some embodiments, the restrictor baffles 916 are orifice plates placed into round exhaust pipes 914c, 914d. In, other embodiments, each of the restrictor baffles 916 may be replaced by a smaller pipe or a rougher pipe, or by a screen or matrix set in the pipe so as to increase the pressure drop through the exhaust of the stack C, D. Although not shown in FIG. 9B, restrictor baffles or other flow restriction devices may also be placed in the exhaust pipes of the stacks A or B, if stacks A and B also need to receive less gas flow. In other embodiments, gas flow through the stacks A and/or B may be increased by increasing the size or diameter of the exhaust pipes 914a, 914b leading from stacks A and/or B to the common exhaust outlet 904a.

In the illustrative embodiment of FIG. 9B, the baffles 916 are formed from stainless steel material. However, it is understood that other materials may be used for the baffles. Moreover, although the baffles 916 are shown in FIG. 9B as solid and as extending partially through the width of the exhaust output line 914c, 914d, it is understood that the baffles 916 may include openings, perforations or vents therein and/or may extend through the entire width of the exhaust output pipe with one or more openings therein so as to control the exhaust flow in a predetermined manner. Also, in some embodiments, multiple baffles 916 may be used in each output line 914c, 914d so as to provide predetermined flow control. In addition, FIG. 9B shows the baffles 916 being placed in the output lines 914c, 914d near the common exhaust outlet 904a, but it is understood that the positioning of the baffles 916 in the output lines 914c, 914d may be varied depending on the system requirements.

FIG. 9C shows the multi stack fuel cell system 900 that has a similar construction as the systems of FIGS. 9A and 9B, with the exception of the baffling used therein. As shown, the system 900 includes stacks A-D enclosed by the enclosure 902 and having a common asymmetric exhaust assembly 904 in which the exhaust output of each stack is connected to the common exhaust outlet 904*a* by a respective exhaust output line 914*a*-*d*. As shown in FIG. 9C, the stack flow balance is corrected using a baffle assembly 926 that uses the principle of the assembly shown in FIG. 8, but with the flow traveling in the opposite direction to that of FIG. 8. As shown in FIG. 9C, the four fuel cell stacks, A, B, C, and D, all empty into a common plenum 904*a* via the respective exhaust output lines 914*a*-*d* which have different path lengths. However, the exhaust path lengths of the respective output lines 914*a*-*d* from the stack pairs A-B and C-D can be changed using the baffle assembly 926 which includes an adjustable sleeve 926*a* configured to extend the path length of the respective output lines.

In FIG. 9C, the adjustable sleeve 926*a* is used to extend the path lengths of the output lines 914*c* and 914*d* by a predetermined amount. In the embodiment shown in FIG. 9C, the adjustable sleeve 926*a* comprises a movable pipe member 927 which has a diameter and length that are smaller than the diameter and length of the exhaust outlet 904*a* and which can be fitted, movably within the exhaust outlet 904*a*. In addition, the adjustable sleeve 926*a* includes a baffle-like member 928 disposed between an outer surface of the pipe 927 and an inner surface of the exhaust outlet 904*a*. The member 928 is disposed near an end of the pipe 927 that is furthest from the stacks A and B. However, the positioning of the member 928 will depend on the configuration and requirements of the exhaust outlet 904*a* and of the output lines 914*c*, 914*d*. As in the previous embodiments, the adjustable sleeve 926*a* may be formed from stainless steel or from other suitable materials.

The sleeve 926*a* can be moved within the exhaust outlet 904*a*, and the amount of extension by which the path lengths of the output lines 914*c* and 914*d* are extended is adjusted by moving the sleeve 926*a* either toward or away from the stacks A-B. For example, if the C-D pair are passing more flow than the A-B pair, then the adjustable sleeve 926 may be moved toward the stacks A-B so that an inlet 927*a* of the pipe 927 is further away from the stacks C-D. This exit plane adjustment results in lengthening of the exhaust path from the stacks C and D and in a pressure drop across the stacks C and D, thus, causing less flow through the stack pair C-D and increasing the flow through the stack pair A-B. Moving the adjustable sleeve 926 away from A-B so that the pipe inlet 927 is closer to the stacks C and D has the opposite effect of increasing the flow through the stack pair C-D and decreasing the flow through the stack pair A-B. After a predetermined flow balance is achieved, the adjustable sleeve may be locked or welded into place, or the inlet 927*a* place may be marked and measured, and mass production could commence with interchangeable exhaust parts using that same measurement. The same flow control may be accomplished using an adjustable sleeve assembly with an upward-facing entrance instead of the inlet 927*a*, or with a fixed sleeve that has an adjustable opening or openings therein. Once the desired flow balance is established in a prototype, the position of the sleeve entrance or other openings could be fixed in subsequently manufactured exhaust assemblies.

FIG. 9A, FIG. 9B, and FIG. 9C show illustrative examples of the how the single fuel cell stack manifold assemblies of FIGS. 1-8 may be adapted into baffle assemblies to control the gas flow through a multi-stack fuel cell system. It is understood that the specific configurations of the baffles and their positioning in the enclosure and/or the exhaust assembly of the multi-stack system may be varied to achieve various configurations and to control the flow of fuel and oxidant gases through the stacks.

In all cases it is understood that the above-described arrangements are merely illustrative of the many possible specific embodiments, which represent applications of the present invention. Numerous and varied other arrangements, including use of different materials and various configurations of components of the manifold assembly, can be readily devised in accordance with the principles of the present invention without departing from the spirit and scope of the invention.

What is claimed is:

1. A method of controlling gas flow distribution in a fuel cell stack, said method comprising:
    providing a fuel cell stack including an anode inlet face, an anode outlet face, a cathode inlet face and a cathode outlet face;
    providing at least one manifold assembly including an external manifold abutting said external manifold to sealingly enclose at least one face of the fuel cell stack and at least one baffle within an enclosure of the external manifold, wherein the at least one baffle does not contact the fuel cell stack;
    supplying fuel inlet gas to the anode inlet face of the fuel cell stack and oxidant inlet gas to the cathode inlet face during operation of the fuel cell stack;
    receiving exhaust gas in the enclosure of the external manifold from the fuel cell stack and controlling, using the at least one baffle, the direction of the exhaust gas flow within the enclosure,
    wherein said providing at least one manifold assembly includes providing an anode exhaust manifold assembly including an anode exhaust external manifold, the enclosure of the anode exhaust external manifold including an opening facing the anode outlet face of the fuel cell stack and at least one exhaust outlet formed in the enclosure for outputting anode exhaust gas from the external manifold; said receiving comprises receiving anode exhaust gas from the anode outlet face of the fuel cell stack through the opening in the external manifold and said controlling comprises controlling, using the at least one baffle, the direction of the anode exhaust gas flow so that the anode exhaust gas flow received from fuel cells closest to the exhaust outlet is directed around the at least one baffle prior to being output from the exhaust outlet.

2. A method of controlling gas flow distribution in accordance with claim 1, wherein said controlling comprises controlling the direction of the anode exhaust flow so as to control back pressure of the anode exhaust in predetermined fuel cells of said fuel cell stack and to reduce the flow amount of the fuel inlet gas into said predetermined fuel cells.

3. A method of controlling gas flow distribution in accordance with claim 1, wherein: the enclosure of the anode exhaust external manifold includes an outer wall opposing the opening, opposing top and bottom walls connected to the outer wall and first and second opposing sidewalls connected to the outer wall and to the top and bottom walls; each of the plurality of baffles includes first and second opposing ends coupled with the first and second sidewalls of the enclosure, respectively; said baffles are successively disposed along a portion of the height of the enclosure with successive baffles being separated by a vent.

4. A method of controlling gas flow distribution in accordance with claim 1, wherein:
    the enclosure of the anode exhaust external manifold includes an outer wall opposing the opening, opposing top and bottom walls connected to the outer wall and first and second opposing sidewalls connected to the outer wall and to the top and bottom walls;
    the manifold assembly includes a plurality of baffles within an enclosure of the external manifold, and each of the plurality of baffles includes first and second opposing ends coupled with the first and second sidewalls of the enclosure, respectively;

said baffles are successively disposed along a portion of the height of the enclosure with successive baffles being separated by a vent.

5. A method of controlling gas flow distribution in accordance with claim 1, wherein: said providing at least one manifold assembly further comprises providing a cathode inlet manifold assembly including a cathode inlet external manifold, the enclosure of the cathode inlet manifold assembly including an opening facing the cathode inlet face of the fuel cell stack, and the at least one baffle disposed in the enclosure of the cathode inlet manifold assembly; said receiving comprises receiving oxidant inlet gas in the cathode inlet external manifold, and said controlling comprises controlling, using the at least one baffle, gas flow distribution of the oxidant inlet gas from the enclosure to the fuel cells in the fuel cell stack so that portions of the fuel cells closest to the anode inlet face of the fuel cell stack receive increased flow of inlet oxidant gas.

6. A method of controlling gas flow distribution in accordance with claim 5, wherein:

said enclosure of the cathode inlet external manifold includes an outer wall, opposing top and bottom walls connected to the outer wall and opposing first and second sidewalls connected to the outer wall and to the top and bottom walls, wherein the first sidewall of the enclosure is disposed closest to the anode inlet face of the stack; and the at least one baffle extends along a portion of a width of the enclosure from the second sidewall of the enclosure in the direction of the first sidewall.

7. A method of controlling gas flow distribution in accordance with claim 1, wherein:

said one or more baffles comprise one or more baffle plates;

each said baffle plate includes a first surface and a second surface opposing the first surface; and each said baffle plate extends in a direction substantially parallel to an outer wall of the external manifold opposing a face of the fuel stack enclosed by the external manifold, so that the first surface of the baffle plate faces the face of the fuel cell stack enclosed by the external manifold and the second surface of the baffle plate faces the outer wall of the external manifold.

* * * * *